Dec. 25, 1928.

D. C. PRINCE 1,696,862

ELECTRICAL APPARATUS

Filed Aug. 23, 1926

Inventor:
David C. Prince,
by
His Attorney

Patented Dec. 25, 1928.

1,696,862

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

ELECTRICAL APPARATUS.

Application filed August 23, 1926. Serial No. 131,016.

My invention relates to electrical apparatus which comprises a space discharge device provided with a grid for controlling the transmission of current between its cathode and anode, and has for its principal object the provision of an improved means for maintaining a bias voltage on this grid when the apparatus is operated at low frequencies such as those encountered in power transmission systems.

In the use of space discharge devices, it is customary to produce a grid bias potential by means of a resistor connected in the grid circuit of the device in parallel with an energy storage means such as a condenser. This arrangement is satisfactory when the apparatus is operated at audio or radio frequencies but is likely to be unsatisfactory when subjected to the comparatively low frequency of the usual power transmission system, the cause of this difficulty being that the condenser tends to dissipate its stored energy during the time that a negative potential is applied to the grid of the device. In accordance with my invention, this difficulty is avoided either by the provision of means operable to interpose a very high resistance in the discharge circuit of the condenser when the grid potential is negative, or by the provision of means for periodically renewing the stored energy of the condenser while the grid of the space discharge device is charged to a negative potential.

My invention will be better understood from the following description when considered in connection with the accompanying drawings and its scope will be pointed out in the appended claims.

Figure 1:
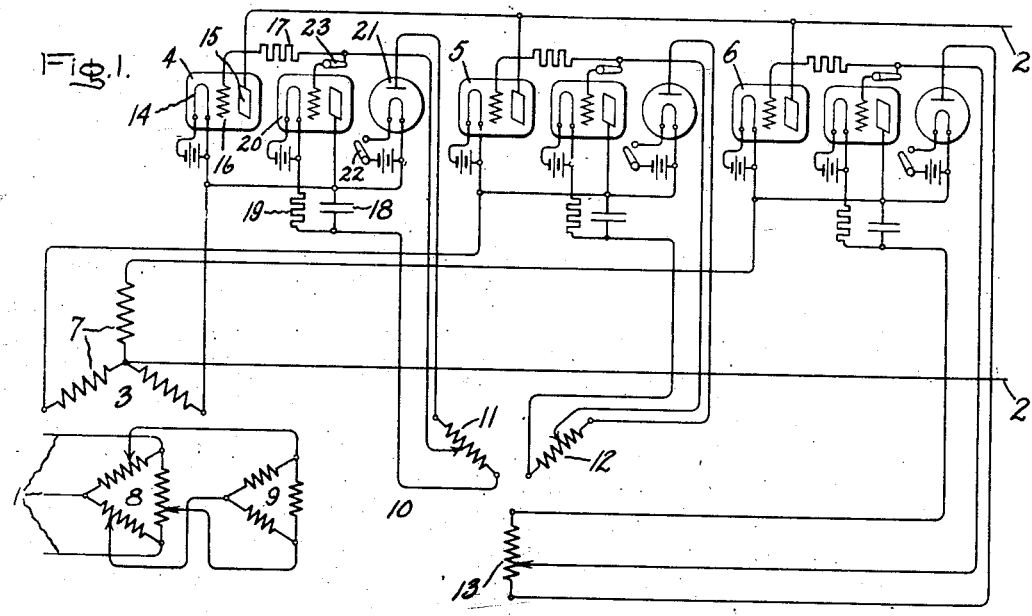
Figure 2:
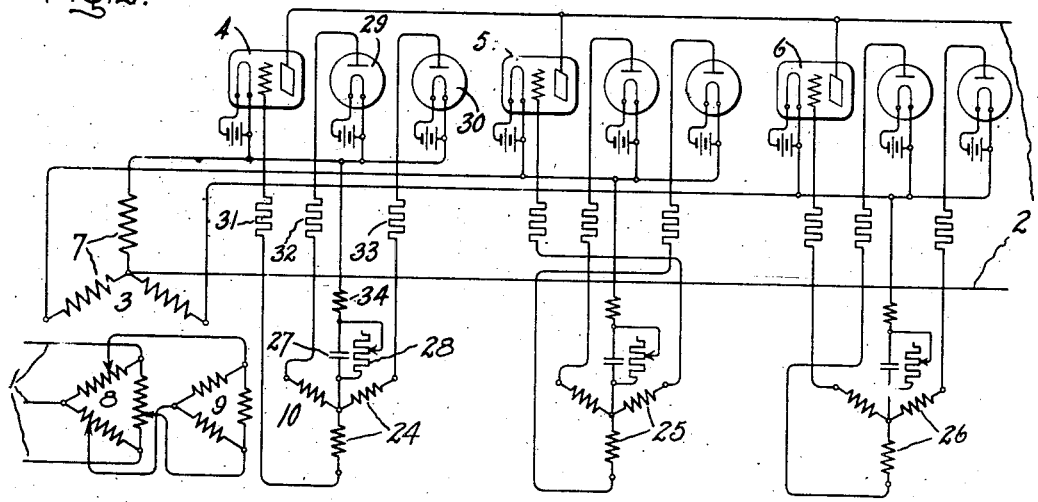

Referring to the drawings, Fig. 1 shows an apparatus wherein undesirable variations in the grid bias potential are prevented by an electrical valve connected in the discharge circuit of the energy storage means; and Fig. 2 shows an apparatus for periodically renewing the supply of energy stored in the energy storage means.

Fig. 1 shows alternating current terminals 1 which are interconnected with direct current terminals 2 through means comprising a polyphase transformer 3 and space discharge devices 4, 5 and 6 each connected between one of the direct current terminals and a different phase of a winding 7 of the transformer 3. The transformer 3 also comprises a winding 8 which is connected to the primary circuit 9 of a grid transformer 10 through a connection which may be adjusted to vary the phase relation between the grid and anode potentials of the devices 4, 5 and 6. The transformer 10 comprises separate secondary phase windings 11, 12 and 13 through which the grid potentials of the devices 4, 5 and 6 are respectively controlled.

The device 4 comprises a cathode 14 which is connected to one phase terminal of the winding 7, an anode 15 which is connected to one of the direct current terminals 2, and a grid 16 which is connected to the cathode 14 through a resistor 17, an adjustable part of the phase winding 11 and grid bias means comprising a condenser 18, a resistor 19 and a valve 20 having its grid potential varied in the same manner as the grid potential of the valve 4. A valve 21 is provided for charging the condenser 18 and closing the valve 4 when it is desired to interrupt the connections between the terminals 1 and 2, this result being produced by closing a switch 22 in the cathode heating circuit of the valve 21 and operating a switch 23 to interrupt the grid excitation of the valve 20. The connections of the devices 5 and 6 to the different phases of the winding 7 and to the terminals 2 are in all respects similar to those of the device 4 and will be readily understood without detailed explanation.

In the operation of the apparatus, power may be transmitted in either direction between the terminals 1 and 2, the connections of the terminals 2 being reversed and the phase of the said potentials being properly adjusted when the direct current polarity is reversed. The frequency of the alternating current voltage is determined by synchronous machines connected to the terminals 1 or by other suitable means.

The operation of the apparatus will be readily understood if it be assumed that power is supplied from the terminals 2 to the terminals 1 and that the phase rotation of the winding 7 is in a clockwise direction. Under these conditions, positive half cycles of voltage separated by a phase angle determined by the adjustment of the connection between the windings 8 and 9 are applied successively to the grid and cathode of device 4, to the grid and cathode of device 5, and to the grid and cathode of device 6. Due to these voltages, current is transmitted successively through the devices 4, 5 and 6 during time intervals which overlap to an extent dependent on the bias potential maintained by the condensers connected in the grid circuits of the devices.

The manner in which these bias potentials are produced will be readily understood from a consideration of the valves 4 and 20 which are associated with one phase of the winding 7. When the grid potentials of the valves 4 and 20 become positive, the condenser 18 is charged in a manner to produce negative bias voltage between the grid 16 and cathode 14 of valve 4. When the grid potentials of the valves 4 and 20 become negative, the current through the valve 4 is interrupted and rapid decrease of the bias voltage is prevented due to the negative grid potential of the valve 20 which is connected in the discharge circuit of the condenser. It will be apparent that the condenser 18, the resistor 19 and the valve 20 function as a grid leak which has the resistance of its leakage path increased to a very high value during the interval when the valve 4 is closed. Proper operation of the apparatus even at very low frequencies is thus ensured.

Fig. 2 illustrates an apparatus which differs from that of Fig. 1 in that the grid transformer 10 is provided with three separate secondary windings 24, 25 and 26. It will be observed that the neutral of the winding 24 is connected through a grid bias element, shown as a condenser 27 and a resistor 28, to the cathode of the device 4 and also to the cathodes of a pair of space discharge devices 29 and 30; and that the phase terminals of the winding 24 are connected respectively through a resistor 31 to the grid of the device 4, and through the resistors 32 and 33 to the anodes of the devices 29 and 30. A smoothing reactor 34 may be interposed in the neutral connection of the winding 24.

With these connections, the polyphase currents of the winding 24 are rectified by the devices 4, 29 and 30 and the rectified current is transmitted through the grid bias element in a manner to periodically restore its store of energy and maintain variations in the grid bias potential of the device 4 within predetermined limits. The means for controlling the grid potentials of devices 5 and 6 need not be described in detail for the reason that they are similar to that described in connection with the device 4. In view of what has been said, it will be apparent that the grid bias potential control elements of Figs. 1 and 2 function to maintain the bias potential within predetermined limits either by periodically increasing the resistance of the leakage circuit or by periodically restoring the energy of the energy storage means. In either case, undesirable fluctuations in the bias potentials when the apparatus is operated at low frequency are prevented.

The embodiments of the invention illustrated and described herein have been selected for the purpose of clearly setting forth the principles involved. It will be apparent however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:—

1. The combination of a space discharge apparatus provided with a cathode and an anode and with a grid arranged to control the current transmitted between said cathode and anode, low frequency current supply means, an energy storage device connected between said grid and cathode through said supply means, and means comprising a space discharge apparatus provided with a control electrode arranged to maintain the stored energy of said device while the potential of said grid is negative.

2. The combination of a space discharge apparatus provided with a cathode and an anode and with a grid arranged to control the current transmitted between said cathode and anode, low frequency current supply means, an energy storage device connected between said grid and cathode through said supply means, means comprising a second space discharge apparatus connected in shunt to said device, and means for regulating the resistance of said second space discharge device in accordance with the polarity of said supply means.

3. The combination of alternating and direct current terminals, a space discharge apparatus provided with a cathode and anode connected between said terminals and with a grid arranged to control the current transmitted between said terminals, means operable to produce a potential which varies in accordance with variations in the potential of one of said terminals, an energy storage device connected between said grid and cathode through said means, and means comprising a space discharge apparatus arranged to control the stored energy of said device.

4. The combination of a pair of terminals, a space discharge apparatus provided with a cathode and an anode connected between said terminals and with a grid arranged to control the current transmitted between said cathode and anode, low frequency current supply means, an energy storage device connected between said grid and cathode through said supply means, and means comprising a second space discharge apparatus provided with a cathode and an anode connected to said device and with a grid connected to said supply means for maintaining the stored energy of said device when the potential of said first mentioned grid is negative.

5. The combination of a space discharge apparatus provided with a cathode and an anode and with a grid arranged to control the current transmitted between said cathode and anode, low frequency current supply means, an energy storage device connected between said grid and cathode through said supply means, and a space discharge apparatus provided with a cathode and anode connected in shunt to said storage device and with a grid connected to said supply means.

6. The combination of a space discharge apparatus provided with a cathode and an anode and with a grid arranged to control the current transmitted between said cathode and anode, low frequency current supply means, an energy storage device connected between said grid and cathode through said supply means, a resistor, grid bias potential control means connected to the terminals of said device through said resistor, and means for regulating the resistance of said control means in accordance with the polarity of said supply means.

7. The method of maintaining the grid bias potential of a space discharge apparatus wherein a grid is connected to a cathode through an energy storage device and a low frequency current supply means and wherein control means are connected between the terminals of said storage device, which comprises regulating the resistance of said control means in accordance with the polarity of said supply means.

In witness whereof, I have hereunto set my hand this 21st day of August 1926.

DAVID C. PRINCE.